United States Patent
Ganga et al.

(10) Patent No.: US 9,424,064 B2
(45) Date of Patent: Aug. 23, 2016

(54) ADAPTOR IMPLEMENTATION FOR INTERNET PROTOCOL ADDRESS AND PORT HOPPING

(71) Applicant: Raytheon BBN Technologies Corp., Cambridge, MA (US)

(72) Inventors: Gangadhar Ganga, Clearwater, FL (US); Alen Cruz, Tampa, FL (US); Suzanne P. Hassell, Clearwater, FL (US); Paul F. Beraud, III, Parrish, FL (US); Ledford J. Meadows, III, Wesley Chapel, FL (US); Stephen Patrick Marra, Palm Harbor, FL (US); Jeanette M. Moody, Palm Harbor, FL (US); Stephen R. Martin, Largo, FL (US)

(73) Assignee: Raytheon BBN Technologies Corp., Cambridge, MA (US)

(*) Notice: Subject to any disclaimer, the term of this patent is extended or adjusted under 35 U.S.C. 154(b) by 207 days.

(21) Appl. No.: 14/449,876

(22) Filed: Aug. 1, 2014

(65) Prior Publication Data
US 2016/0036691 A1 Feb. 4, 2016

(51) Int. Cl.
*G06F 15/173* (2006.01)
*G06F 9/455* (2006.01)
(Continued)

(52) U.S. Cl.
CPC ........ *G06F 9/45558* (2013.01); *H04L 63/1408* (2013.01); *G06F 9/455* (2013.01); *G06F 2009/45595* (2013.01); *H04L 12/2602* (2013.01)

(58) Field of Classification Search
CPC .................. G06F 9/45558; G06F 2009/45595; G06F 9/455; H04L 63/1408; H04L 12/2602
See application file for complete search history.

(56) References Cited

U.S. PATENT DOCUMENTS

| 6,880,090 B1* | 4/2005 | Shawcross | H04L 12/18 709/225 |
| 2004/0003116 A1* | 1/2004 | Munger | H04L 29/12216 709/245 |

(Continued)

FOREIGN PATENT DOCUMENTS

| WO | WO 01/82548 A2 * | 11/2001 | H04L 29/00 |
| WO | WO 01/91397 A2 * | 11/2001 | H04L 29/00 |

OTHER PUBLICATIONS

"Security Fan tm Framework", (c) 2011 Northrop Grumman Systems Corporation, (2011), 4 pgs.

(Continued)

*Primary Examiner* — Krisna Lim
(74) *Attorney, Agent, or Firm* — Schwegman Lundberg & Woessner, P.A.

(57) ABSTRACT

A system and method of deploying a network hopping adaptor is disclosed. In some embodiments, a network hopping adaptor may be configured to manipulate network traffic so as to change at least one network characteristic of the network traffic, and at least one network interface of a machine selected from a group of machines may be configured to send the network traffic to the network hopping adaptor. The network hopping adaptor may manipulate such characteristics as an IP address, a port number, an encryption algorithm or a compression algorithm. The group of machines may be deployed as virtual machines being executed by a virtualization server, and the network hopping adaptor may be implemented on another virtual machine being executed by the virtualization server. Alternatively, or in addition, the group of machines or the network hopping adaptor may be implemented as physical machines.

20 Claims, 7 Drawing Sheets

(51) Int. Cl.
*H04L 29/06* (2006.01)
*H04L 12/26* (2006.01)

(56) References Cited

U.S. PATENT DOCUMENTS

2008/0008179 A1* 1/2008 Chen .................. H04L 61/2007
370/392

2010/0135287 A1* 6/2010 Hosain .................... H04L 47/10
370/389

OTHER PUBLICATIONS

Shi, Leyi, et al., "Full Service Hopping for Proactive Cyber-Defence", IEEE International Conference on Networking, Sensing and Control, 2008. (ICNSC 2008), (2008), 1337-1342.

* cited by examiner

ADAPTOR IMPLEMENTATION FOR INTERNET PROTOCOL ADDRESS AND PORT HOPPING

GOVERNMENT RIGHTS

This invention was made with Government support under Contract Number W15P7T-12-C-A111. The Government has certain rights in this invention.

TECHNICAL FIELD

The present application relates generally to the technical field of network security, and, in various embodiments, to systems and methods of implementing a network hopping adaptor in communication with one or more machines, where the network hopping adaptor manipulates network traffic from the one or more machines to change a network characteristic of the network traffic.

BACKGROUND

Network hopping is a technique that obfuscates outgoing network traffic from a computer. However, previous attempts at implementing network hopping required undesirably changing the computer's components, such as modifying the computer's operating system, installing a new application, or modifying one or more existing applications. These changes would require time and effort, which may be better spent on other activities. Furthermore, the user of the computer may become aware that network hopping was being used, which may also be undesirable. Accordingly, a different approach to network hopping would be beneficial.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
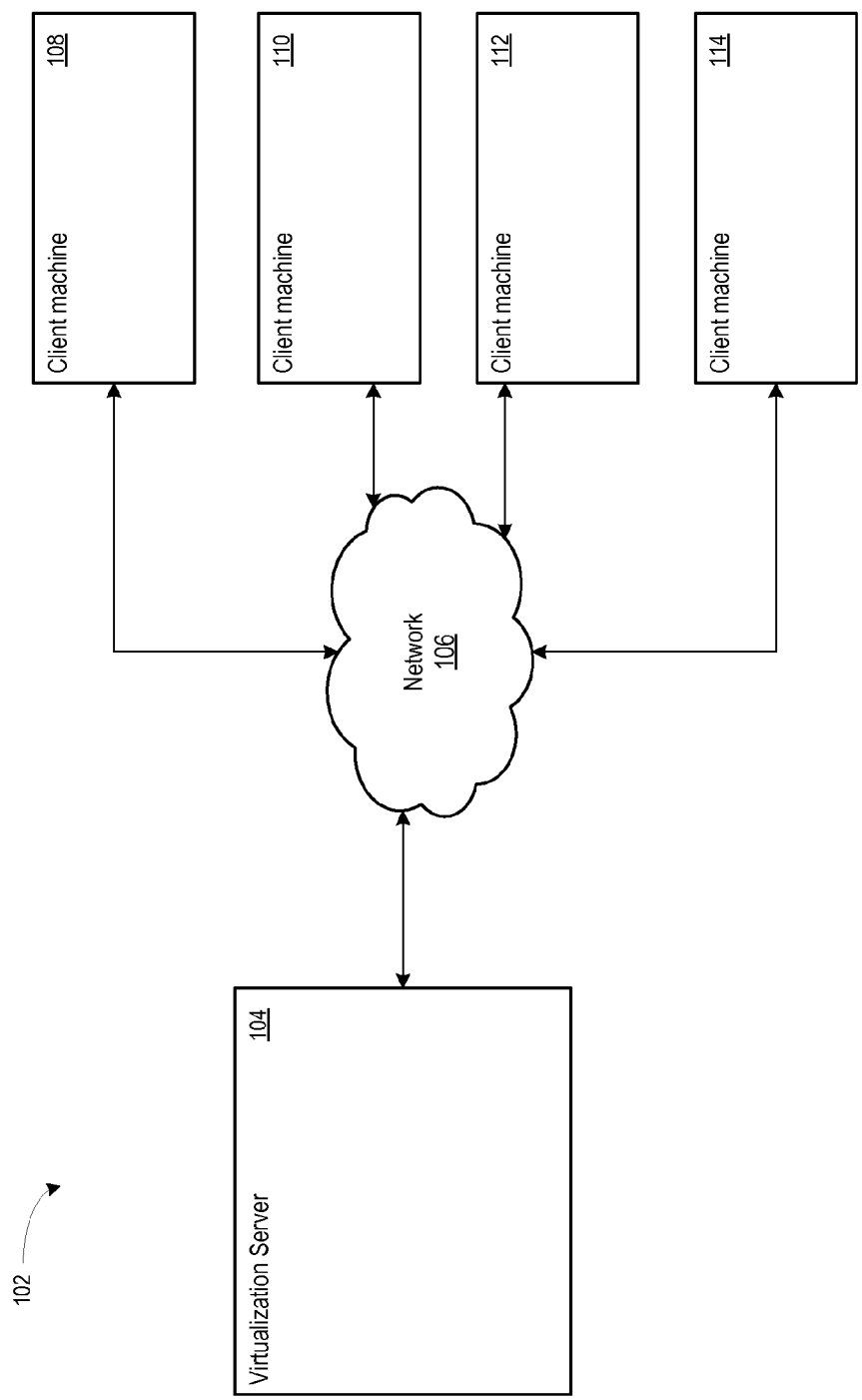
FIG. 1 illustrates a network architecture of an exemplary system according to aspects of the disclosure.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure provides systems and methods for a network hopping adaptor that supports Internet Protocol address and/or port hopping. The network hopping adaptor may be implemented as an external and/or internal adaptor. The network hopping adaptor allows a computer's operating system and applications to remain unchanged and unaware that they are participating in a hopping network. Furthermore, the disclosed systems and methods support a computer node to participate in a hopping local area network ("LAN") by hopping the computer node's address and port information in accordance with a configuration established for the hopping LAN. In one embodiment, the network hopping adaptor may be implemented as a single instance supporting an entire node or group of nodes, single or multiple physical interfaces, including a virtualized server environment. In another embodiment, multiple interfaces may be supported by associating each interface with an independently operating network hopping adaptor, which hops outgoing data and unhops incoming data, and then passes the unhopped traffic to a router or similarly configured network bridge, which may then send the unhopped traffic out on an independent hopping interface.

To support these and other objectives, this disclosure provides a computer-implemented method comprising establishing a network hopping adaptor, the network hopping adaptor being configured to manipulate network traffic so as to change at least one network characteristic of the network traffic and configuring at least one network interface of a machine selected from a plurality of machines to send and receive network traffic to and from the network hopping adaptor. When the network hopping adaptor receives network traffic from the selected machine, the method may include invoking the network hopping adaptor on the received network traffic, the network hopping adaptor causing a change to at least one network characteristic of the received network traffic, and sending the received network traffic from the network hopping adaptor as hopped network traffic based on the change to the at least one network characteristic. When the network hopping adaptor receives network traffic intended for the selected machine, the method may include invoking the network hopping adaptor on the network traffic intended for the selected machine, the network hopping adaptor undoing the change to the at least one network characteristic of the received network traffic so as to create unhopped network traffic, and sending the unhopped network traffic to the selected machine.

In another embodiment of the computer-implemented method, the method may include instantiating the plurality of machines, wherein each machine comprises a virtual machine being executed by a physical machine.

In a further embodiment of the computer-implemented method, the network hopping adaptor is being executed by a designated machine, and the designated machine and the plurality of machines each comprise at least one machine being executed by a physical machine.

In yet another embodiment of the computer-implemented method, the network hopping adaptor may be executed by a designated machine.

In yet a further embodiment of the computer-implemented method, the network hopping adaptor may be established as a physical machine.

In another embodiment of the computer-implemented method, the change to at least one network characteristic of the received network traffic may be based on time.

In a further embodiment of the computer-implemented method, the at least one network characteristic may include an Internet Protocol ("IP") address, a media access control address ("MAC") address, a port number, an encryption algorithm or a compression algorithm.

This disclosure also provides for a system that may include a plurality of machines, each machine having at least one network interface configured to send and receive network traffic to and from a network hopping adaptor, and a network hopping adaptor in communication with the plurality of machines via a local area network. When the network hopping adaptor receives network traffic, the network hopping adaptor may be configured to manipulate the received network traffic so as to change at least one network characteristic of the network traffic, and send the manipulated network traffic as hopped network traffic based on the change to the at least one network characteristic. When the network hopping adaptor receives network traffic that is intended for the at least one machine, the network hopping adaptor may be configured to manipulate the network traffic intended for the at least one machine so as to undo the change to the at least one network characteristic of the network traffic, and send the manipulated network traffic as unhopped network traffic to the at least one machine.

In another embodiment of the system, each machine of the plurality of machines may include a virtual machine being executed by a physical machine.

In a further embodiment of the system, the network hopping adaptor may be executed by a designated machine, and the designated machine and the plurality of machines may each comprise at least one machine being executed by a physical machine.

In yet another embodiment of the system, the network hopping adaptor may be executed by a designated machine.

In yet a further embodiment of the system, the network hopping adaptor may be established as a physical machine.

In another embodiment of the system, the change to at least one network characteristic of the received network traffic may be based on time.

In a further embodiment of the system, the at least one network characteristic may include an IP address, a MAC address, a port number, an encryption algorithm or a compression algorithm.

This disclosure further provides for a non-transitory, computer-readable medium having computer-executable instructions stored thereon that, when executed by one or more processors, the one or more processors are configured to perform a method. In various embodiments, the method may include configuring at least one network interface of a machine selected from a plurality of machines to send and receive network traffic to and from a network hopping adaptor in communication with the selected machine via a local area network. When the network hopping adaptor receives network traffic from the selected machine, the network hopping adaptor may manipulate the received network traffic so as to change at least one network characteristic of the network traffic, and send the manipulated network traffic as hopped network traffic based on the change to the at least one network characteristic. When the network hopping adaptor receives network traffic that is intended for the selected machine, the network hopping adaptor may manipulate the received network traffic so as to undo a change to the at least one network characteristic of the network traffic, and send the manipulated network traffic as unhopped network traffic to the selected machine.

In another embodiment of the non-transitory, computer-readable medium, each machine of the plurality of machines may include a virtual machine being executed by a physical machine.

In a further embodiment of the non-transitory, computer-readable medium, the network hopping adaptor is being executed by a designated machine, and the designated machine and the plurality of machines each comprise at least one machine being executed by a physical machine.

In yet another embodiment of the non-transitory, computer-readable medium, the network hopping adaptor may be established as a physical machine.

In yet a further embodiment of the non-transitory, computer-readable medium, the change to at least one network characteristic of the received network traffic is based on time.

In another embodiment of the non-transitory, computer-readable medium, the at least one network characteristic may include an IP address, a MAC address, a port number, an encryption algorithm or a compression algorithm.

The methods or embodiments disclosed herein may be implemented as a computer system having one or more modules (e.g., hardware modules or software modules). Such modules may be executed by one or more processors of the computer system. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled.

A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments. It is contemplated that any features of any embodiments disclosed herein can be combined with any other features of any other embodiments disclosed herein. Accordingly, these any such hybrid embodiments are within the scope of the present disclosure.

Furthermore, the methods or embodiments disclosed herein may be embodied as instructions stored on a machine-readable medium that, when executed by one or more processors, cause the one or more processors to execute the instructions.

FIG. 1 is a network diagram depicting a system 102 according to aspects of the disclosure. In one embodiment, a server, such as virtualization server 104, may be in communication with one or more clients, such as clients 108-114. The virtualization server 104 may communicate with the clients 108-114 using a network, such as the network 106. The network 106 may include one or more networks such as wired networks (e.g., Ethernet), Plain Old Telephone Service (POTS), or wireless (e.g., mobile, cellular, Wi-Fi, WiMAX) networks. Network 106 may also include one or more private networks (e.g., Local Area Networks) and public networks (e.g., the Internet). The clients 108-112 may include web clients (e.g., a browser, such as the Internet Explorer browser developed by Microsoft Corporation of Redmond, Wash. State), programmatic clients (e.g., clients that may access the server 104 using one or more application programming interfaces ("APIs")), or combinations thereof.

Figure 2:
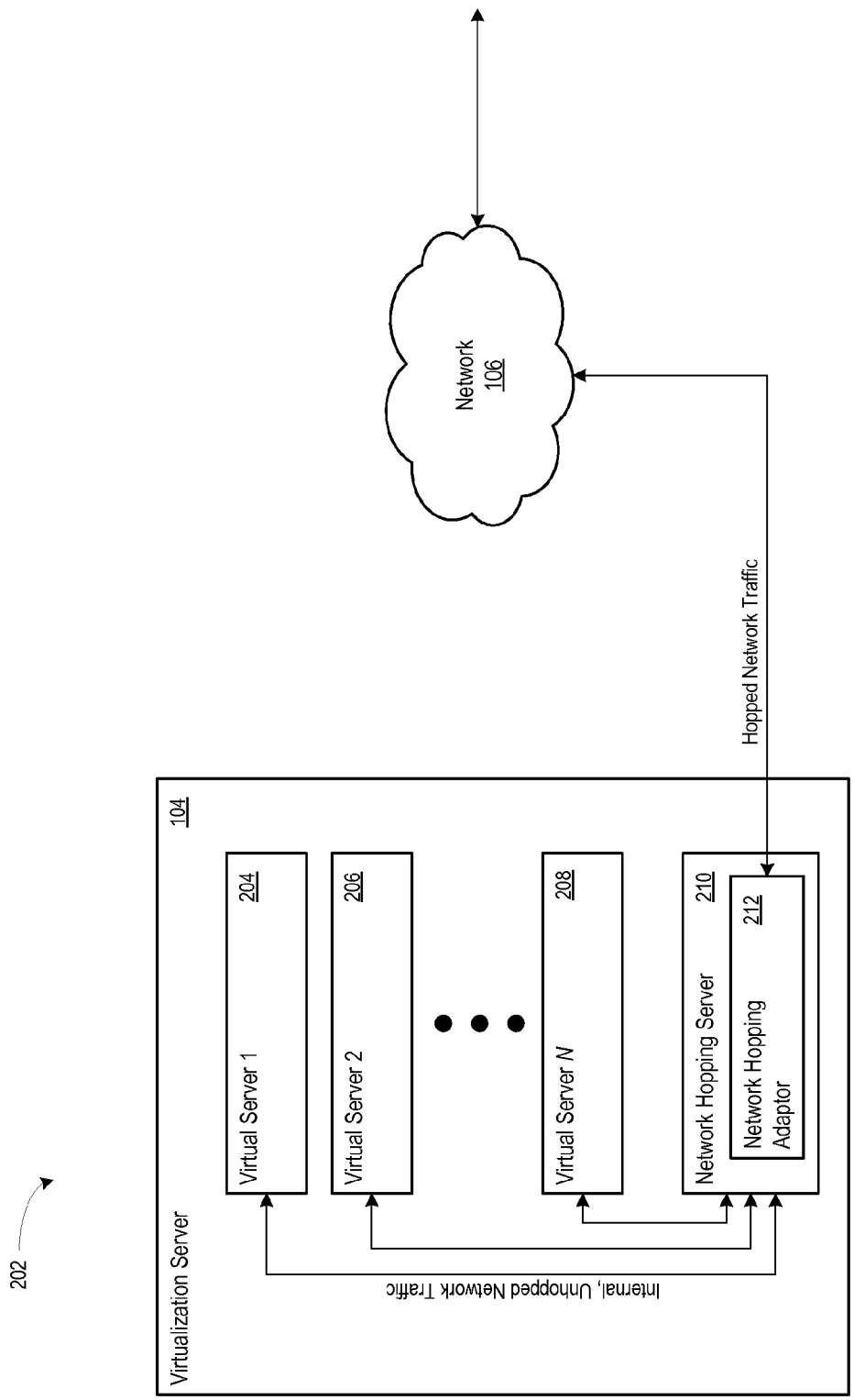
FIG. 2 illustrates an exemplary implementation of the server-side network architecture shown in FIG. 1 according to aspects of the disclosure.

FIG. 2 illustrates an exemplary implementation of the server-side network architecture 202 shown in FIG. 1 according to aspects of the disclosure. In one embodiment, the server-side network architecture 202 may include the virtualization server 104 executing one or more virtual servers 204-208. As understood in the art, virtualization generally refers to refers to the act of creating a virtual (rather than actual) version of something, including but not limited to a virtual computer hardware platform, operating system (OS), storage device, or computer network resources. The virtualization server 104 may be a hypervisor, which may include one or more pieces of computer software, firmware or hardware that creates and runs virtual machines. A computer on which a hypervisor is running one or more virtual machines may be considered a host machine. Each virtual machine may therefore be called a guest machine. The hypervisor may present the guest operating systems with a virtual operating platform and may manage the execution of the guest operating systems. Multiple instances of a variety of operating systems may share the virtualized hardware resources. Examples of hypervisors include Hyper-V®, VMware Fusion®, VMware vSphere®, and other such hypervisors.

The virtualization server 104 may execute (i.e., virtualize), one or more virtualized servers 204-208, which may be in communication with one or more of the clients 108-112 illustrated in FIG. 1. The virtualized servers 204-208 may be configured with any kind of operating system including, but not limited to, Microsoft® Windows Server® 2012 R2, Red Hat® Enterprise Linux®, Oracle® Solaris® 11, or combinations thereof. Other such server operating systems are also contemplated.

The virtualized servers 204-208 may communicate with the one or more clients 108-112 via a network hopping server 210. In one embodiment, the network hopping server 210 may also be a virtualized server and be configured with any of the foregoing previously discussed operating systems. The virtualized servers 204-208 may each include a virtualized network interface, such as a wired and/or wireless network interface, that is configured to send and/or receive network traffic via the network hopping server 210. For example, the network hopping server 210 may be configured as a proxy server for the virtualized servers 204-208. As understood in the art, a proxy server may be a computer system or application that acts as an intermediary for network traffic between one or more machines. A first machine may connect to the proxy server, requesting one or more resources, such as a file, connection, web page, or other such resources available from a second machine and the proxy server may service the request as if the first machine had requested the resource directly from the second machine.

The network hopping server 210 may further employ a network hopping adaptor 212, which may send and/or receive network traffic to and/or from one or more of the virtualized servers 204-208. The network hopping adaptor 212 may be configured so as to manipulate and/or change one or more network characteristics of the network traffic received from the virtualized servers 204-208. The network characteristics changed by the network hopping adaptor 212 may include such characteristics as an Internet Protocol ("IP") address, a media access control ("MAC") address, a port number, a compression algorithm, an encryption algorithm, other network characteristics or combinations of the foregoing. Furthermore, one or more of the clients 108-114 may be configured with a similar network hopping adaptor so as to "unhop" the hopped network traffic sent by the network hopping adaptor 212. In addition, when the network hopping adaptor 212 receives network traffic from one or more of the clients 108-114, which may be hopped network traffic, intended for one or more of the virtualized servers 204-208, the network hopping adaptor 212 may be configured to unhop the received network traffic. Thus, network traffic sent and/or received from the network hopping adaptor 212 may be exceedingly difficult to intercept or interpret even if it is intercepted.

In one embodiment, the network hopping adaptor 212 may be implemented as described in U.S. patent application Ser. No. 14/185,020, titled "Method For Selection of Unique Next-Time-Interval Internet Protocol Address and Port" and filed Feb. 20, 2014, the entirety of which is incorporated by reference herein.

Moreover, because the network hopping adaptor 212 occurs downstream from the virtualized servers 204-208, no additional configurations to the virtualized servers 204-208 are needed to produce the hopped network traffic. In this manner, the disclosed network hopping server 210 and network hopping adaptor 212 makes it possible to deploy a virtualized environment without having to change the underlying components of a virtualized server.

Figure 3:
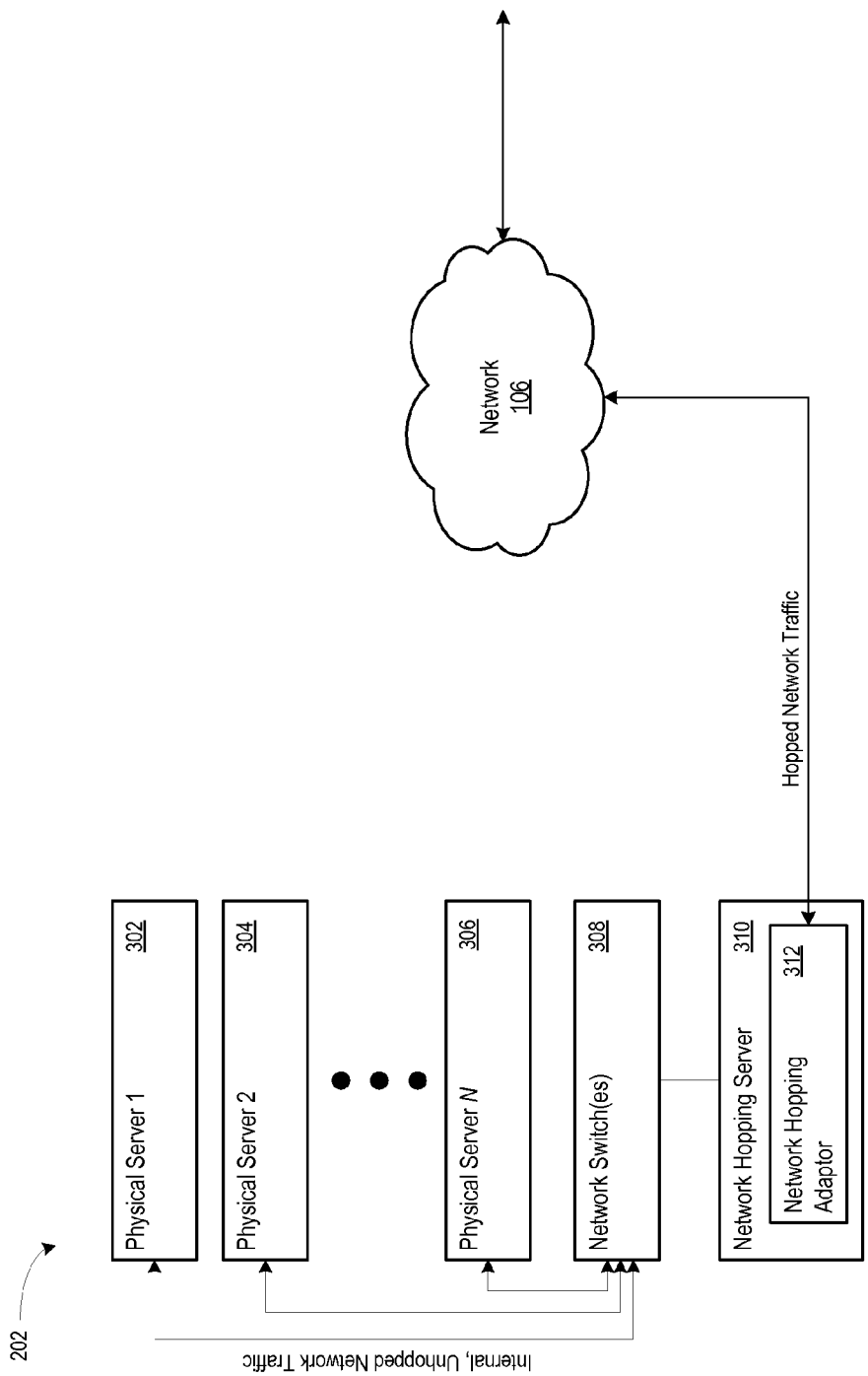
FIG. 3 illustrates another exemplary implementation of the server-side network architecture shown in FIG. 1 according to aspects of the disclosure.

FIG. 3 illustrates another exemplary implementation of the server-side network architecture 202 shown in FIG. 1 according to aspects of the disclosure. In one implementation of the network architecture 202, and with reference to FIG. 2, the virtualized servers 204-208 may instead be implemented as physical machines 302-306. Furthermore, the network architecture 202 may include one or more network switches 308 connected (directly or indirectly) to the physical machines 302-306. Although shown as network switches 308, the server-side network architecture 202 may also include other network traffic controllers, such as routers, bridges, hubs, and other such network traffic controllers. In turn, the network switches 308 may be connected (directly or indirectly) with a physical network hopping server 310, which may implement, and/or be in communication with, a network hopping adaptor 312. In this manner, the deployment of the network architecture 202 may include physical machines.

While FIG. 2 and FIG. 3 illustrate different deployments of the network architecture 202, it should be understood that combinations or variations of the illustrated deployments are also possible. Accordingly, the network architecture 202 may include combinations of virtualized and physical servers, network switches, routers, bridges, hubs, etc., or variations of such combinations. Furthermore, and as discussed below with reference to FIG. 4 and FIG. 5, the network hopping adaptor 312 may be implemented as a virtual or physical device. Thus, the network hopping adaptor may be implemented as a virtual device instantiated by the network hopping server 210, a physical device in communication with the network hopping server 310 (e.g., via a communication interface such as a Universal Serial Bus), a stand-alone physical device in communication with the virtualized servers 204-208 and/or physical servers 302-306, or in any other such implementation or combination.

Figure 4:
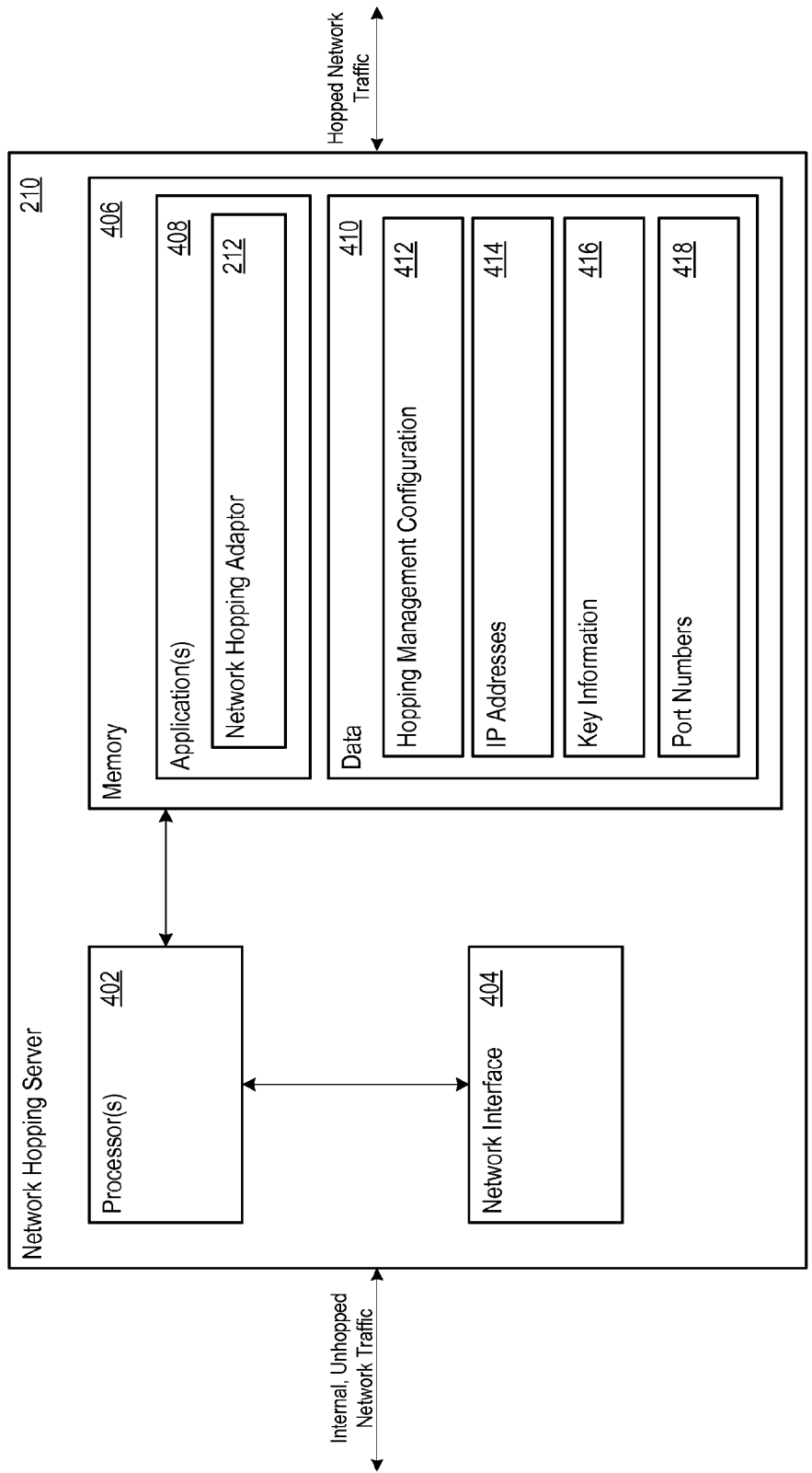
FIG. 4 illustrates an exemplary network hopping server according to aspects of the disclosure.

FIG. 4 illustrates an exemplary network hopping server 210 according to aspects of the disclosure. In one embodiment, the network hopping server 210 may include one or more processor(s) 402, one or more network interface(s) 404, and one or more non-transitory, computer-readable memories 406.

The one or more processor(s) 402 may include commercially available processors, such as processors available from the Intel Corporation, Advanced Micro Devices, Texas Instruments, and other such processors. The one or more network interface(s) 404 may include wired network interfaces (e.g., Ethernet), wireless network interfaces (e.g., Bluetooth®, IEEE 802.11b/g/n, etc.), or combinations of such interfaces. The non-transitory, computer-readable memories 406 may include such memories as hard drives, optical drives, magnetic tapes, Random Access Memory ("RAM"), Flash memory, and other such storage devices.

In addition, the one or more memories 406 may include one or more application(s) 408 and data 410. The application(s) 408 may include the network hopping adaptor 212 as previously discussed. Other application(s) 408 may include operating systems, data management applications, and other such applications. The data 410 may include data used to configure the network hopping adaptor 212. As examples, the data 410 may include hopping management configuration data 412, IP address data 414, key information 416, and port number data 418.

The hopping management data 412 may include data used to configure the hopping LAN. For example, the hopping management data 412 may include LAN configuration data, which may include routing data that specifies network traffic routes. Hopping management data 412 may also include hopping configuration data, which may include configuration information as to how the network hopping adaptor 212 is to hop network traffic. For example, hopping management data 412 may specify the hopping methodology to use in hopping the network traffic, such as whether the hopping occurs based on time sequences, whether a specific algorithm is to be used in hopping the network traffic and/or any key to support such algorithm, whether the network hopping is based on packets (e.g., packets received, packets sent, etc.), and/or whether network hopping uses network striping (i.e., whether faux network traffic is interleaved with genuine network traffic and/or distributed across one or more network interfaces). The hopping management data 412 may also include whether the network hopping adaptor 212 employs a control channel that may specify a port over which packets are exchanged to register hosts, control hopping, and/or coordinate communication methods.

IP address data 414 may include data used to support IP hopping. For example, IP address data 414 may include a table of IP addresses assigned to machines (i.e., virtualized servers and/or physical servers) in communication with the network hopping adaptor 212, and whether those IP addresses are associated with a faux IP address (e.g., a generated IP address) used in hopping the outgoing network traffic. IP address data 414 may also include time information, such that an IP address found in the unhopped outgoing network traffic is replaced with a different faux IP address at specified time intervals. For example, the source IP address of an outgoing IP packet header may be replaced with a first faux IP address generated by the network hopping adaptor 212 at an initial starting time, but then later replaced with a different faux IP address generated by the network hopping adaptor 212 at a subsequent time (e.g., seconds later, minutes later, etc.).

Key information 416 may include one or more keys used by the network hopping adaptor 212. Keys may include cryptographic keys, encoding keys, algorithmic keys, and other such keys. In one embodiment, the key information 416 may include a hopping LAN key used to ensure that the network hopping adaptor 212 determines unique hopping calculations. The hopping LAN key may be a unique 16-bit integer value that one or more adaptors in a hopping LAN use in the algorithm calculations. Where the network hopping server 210 and/or network hopping adaptor 212 belong to multiple hopping LANs, the key information 416 may include multiple, unique LAN keys for each of the hopping LANs.

Port numbers data 418 may include a list of port numbers assigned to the machines (e.g., the virtualized servers and/or physical machines) used to send and/or receive network traffic. The port numbers may be assigned to one or more Transport Control Protocol ("TCP") ports and/or one or more User Datagram Protocol ("UDP") ports. Similar to the IP address data 414, the port numbers data 418 may further change based on one or more factors, such as time, number of packets sent, number of packets received, and other such factors. In one embodiment, the port numbers data 418 may include a lookup table that includes key/value pairs of port numbers and assigned machines (e.g., specified by IP address, MAC address, or other such address).

The illustration FIG. 4 highlights that the network hopping adaptor 212 may be implemented as a virtual device. Furthermore, while FIG. 4 illustrates a single network hopping adaptor 212 may service all outgoing and/or incoming network traffic (i.e., a many-to-one arrangement), the network hopping server 210 may be configured with multiple network hopping adaptors such that each network hopping adaptor communicates with a specific machine (i.e., a one-to-one arrangement). Thus, in an alternative embodiment, a single network hopping adaptor may be assigned to single machine.

Further still, in an environment where there are multiple network hopping adaptors, the network hopping adaptors may perform different functions. For example, the network hopping server 210 may include a first layer of virtual network hopping adaptors that are each assigned to a specific machine and perform a specific function (e.g., IP address hopping or port number hopping), which then communicate their hopped network traffic to a second layer network hopping adaptor, which performs a different function (e.g., encryption, faux and genuine data packet striping/interleaving, etc.). Thus, the flexibility of the virtual implementation of the network hopping adaptor 212 allows the network hopping server 210 to support many different arrangements and LAN configurations.

Figure 5:
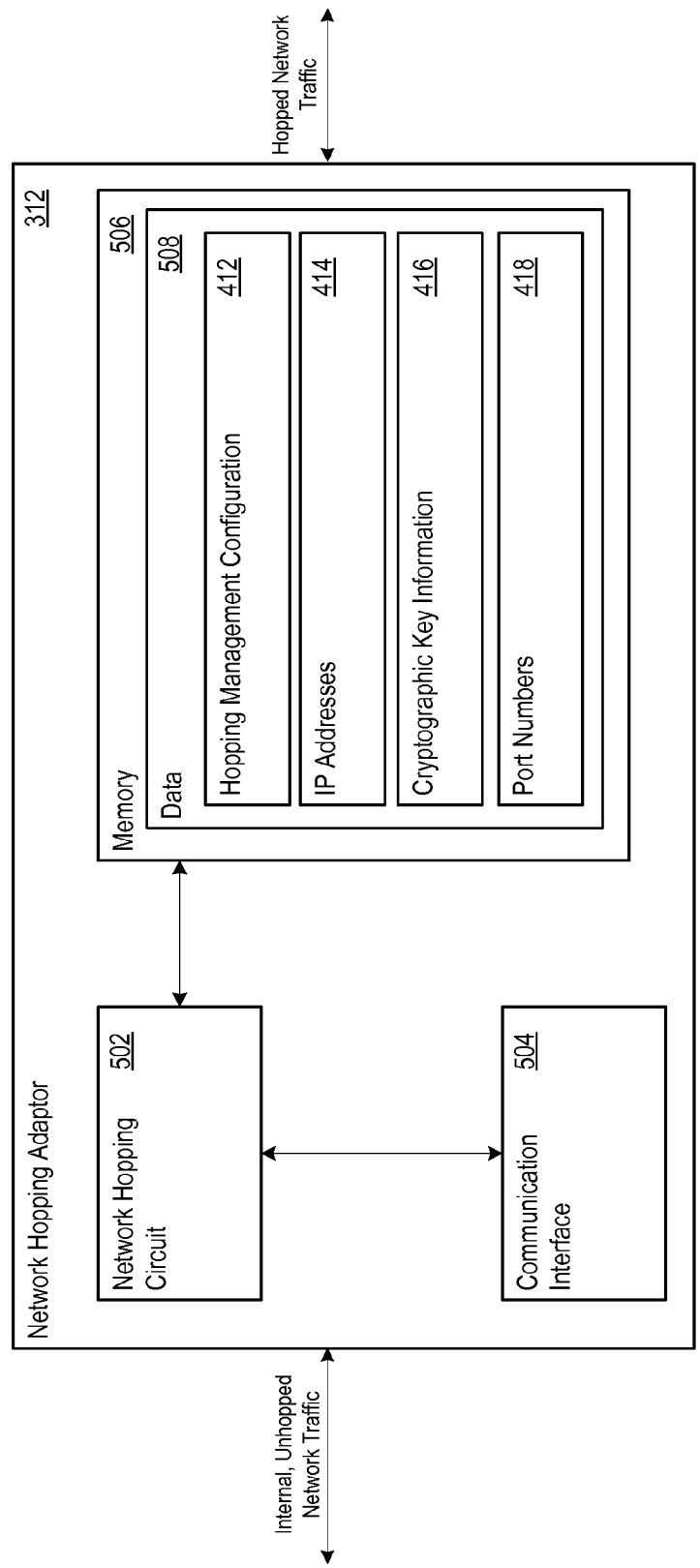
FIG. 5 illustrates an exemplary network hopping adaptor according to aspects of the disclosure.

The network hopping adaptor may also be implemented as a physical machine. FIG. 5 illustrates the exemplary network hopping adaptor 312 according to aspects of the disclosure. The network hopping adaptor 312 may include a network hopping circuit 502, a communication interface 504, and a non-transitory, computer-readable memory 506 that stores network hopping data 508. With reference to FIG. 3, the communication interface 504 may be configured to receive and/or send network traffic to the network hopping server 310, and may be implemented as a wired network interface or as a communication bus, such as a Universal Serial Bus ("USB").

The network hopping circuit 502 may be configured to hop and/or unhop network traffic according to the network hopping data 508 stored in the non-transitory, computer-readable memory 506. For example, the network hopping circuit 502 may load data from the hopping management configuration data 412, from the IP address data 414, the key information 416, and/or the port number data 418. In various embodiments, the network hopping circuit 502 may be deployed as one or more ASICs, as one or more FPGAs, as one or more processors, or combinations of the foregoing.

In this manner, while the network hopping adaptor may be deployed as a virtual device instantiated by the network hopping server 210, the network hopping adaptor may also be deployed as a physical device. By being implemented as a physical device, the network hopping adaptor may reduce the amount of computing resources needed by the network hopping server 210 to process incoming and/or outgoing network traffic.

Furthermore, and with further reference to FIG. 3, the network hopping adaptor 312 may be in direct or indirect communication with the network traffic controllers (i.e., network switch(es) 308). The network hopping adaptor 312 may communicate indirectly with the network switch(es) 308 where the network hopping adaptor 312 is in communication with the network switch(es) 308 via the network hopping server 210, such as where the network hopping adaptor 312 is coupled to the network hopping server 210 via the communication interface 504. Alternatively, the network hopping adaptor 312 may be in direct communication with the network switch(es) 308, such as where the communication interface 504 is coupled to one or more of the network switch(es) 308. Variations or combinations of the foregoing are also possible.

Figure 6:
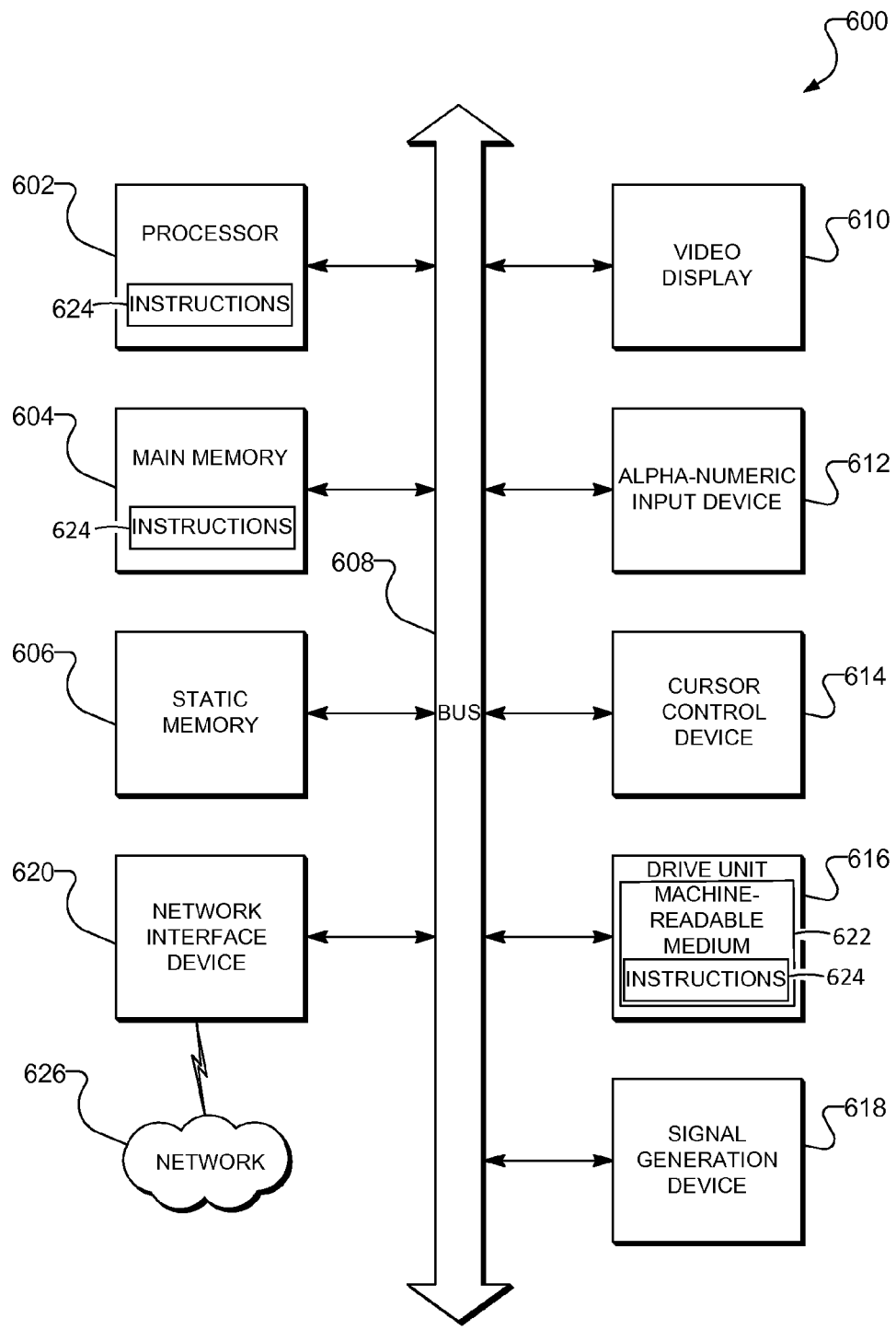
FIG. 6 illustrates is a block diagram illustrating components of a machine, according to some example embodiments, able to read instructions from a machine-readable medium and perform any one or more of the methodologies discussed herein, according to aspects of the disclosure.

FIG. 6 illustrates is a block diagram illustrating components of a machine, according to some example embodiments, able to read instructions from a machine-readable medium and perform any one or more of the methodologies discussed herein, according to aspects of the disclosure. In particular, FIG. 6 illustrates an exemplary computer system 600 within which instructions 624 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a disk drive unit 616, a signal generation device 618 (e.g., a speaker) and a network interface device 620.

The disk drive unit 616 includes a non-transitory machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting non-transitory, machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Figure 7:
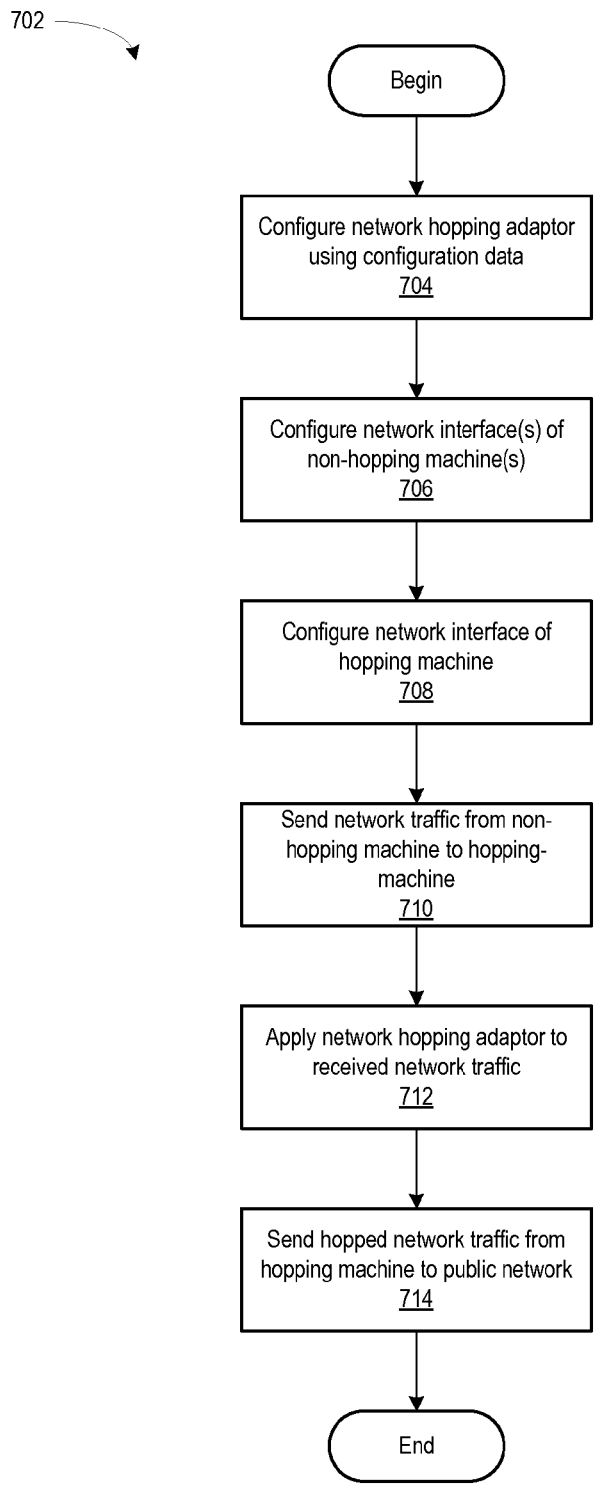
FIG. 7 illustrates an exemplary logic flow for implementing a network hopping adaptor according to aspects of the disclosure.

FIG. 7 illustrates an exemplary logic flow 702 for implementing a network hopping adaptor according to aspects of the disclosure. In one embodiment, the logic flow 702 may begin with configuring the network hopping adaptor using one or more of the data previously discussed (Block 704). For example, configuring the network hopping adaptor may include configuring the network hopping adaptor based on the hopping management configuration data 412, the IP address data 414, the key information 416, and/or the port number data 418.

Thereafter, and with reference to FIG. 2 and FIG. 3, one or more network interfaces of the non-hopping machines may be configured (Block 706). The non-hopping machines may include the virtualized servers 204-208 and/or the physical servers 302-306. The network interfaces may be configured so as to send network traffic to, and/or receive network traffic from, the network hopping server 210/310 and/or the network hopping adaptor 212/312.

Logic flow 702 may then proceed to configuring the network interface and/or communication interface of the hopping machine (i.e., the network hopping server 210/310) (Block 708). Configuring the network interface and/or communication interface of the hopping machine may include identifying which machines (i.e., the virtualized servers 204-208 and/or physical servers 302-306) are to receive incoming network traffic, routing network traffic to and/or from the network hopping adaptor 212/312, or combinations of the foregoing.

Once configured, network traffic may then be sent from the non-hopping machines to the hopping machine (Block 710). Although reference has been made to the network hopping server 210/310 as the hopping machine, in alternative embodiments, the network hopping adaptor 212/312 may be the hopping machine.

The network hopping adaptor 212/312 may then be applied to the received network traffic (Block 712). Applying the network hopping adaptor 212/312 may include applying the network hopping adaptor 212/312 to network traffic originating with the virtualized servers 204-208 and/or physical servers 302-306 or network traffic destined for the virtualized servers 204-208 and/or physical servers 302-306. The hopped network traffic may then be sent to its intended destination (Block 714) on the hopping LAN. Of course, where the network hopping adaptor 212/312 receives hopped network traffic from an outside source (i.e., a machine outside of the physical server hosting the virtualized servers 204-208 and/or physical servers 302-306), the network hopping adaptor 212/312 may unhop the received network traffic and communicate it to its intended recipient.

In this manner, the disclosed systems and methods provide a mechanism by which one or more servers (virtual or physical) can be deployed where the network traffic originating with those servers can be hopped without having to change the underlying components of the deployed servers. Thus, servers may be readily added to a LAN timely and efficiently where the disclosed network hopping adaptor is implemented.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
    establishing a network hopping adaptor, the network hopping adaptor being configured to manipulate network traffic so as to change at least one network characteristic of the network traffic;
    configuring at least one network interface of a machine selected from a plurality of machines to send and receive network traffic to and from the network hopping adaptor;
    when the network hopping adaptor receives network traffic from the selected machine;
        invoking the network hopping adaptor on the received network traffic, the network hopping adaptor causing a change to at least one network characteristic of the received network traffic; and
        sending the received network traffic from the network hopping adaptor as hopped network traffic based on the change to the at least one network characteristic; and
    when the network hopping adaptor receives network traffic intended for the selected machine:
        invoking the network hopping adaptor on the network traffic intended for the selected machine, the network hopping adaptor undoing the change to the at least one network characteristic of the received network traffic so as to create unhopped network traffic; and
        sending the unhopped network traffic to the selected machine.

2. The computer-implemented method of claim 1, further comprising:
    instantiating the plurality of machines, wherein each machine comprises a virtual machine being executed by a physical machine.

3. The computer-implemented method of claim 1, wherein:
    the network hopping adaptor is being executed by a designated machine; and
    the designated machine and the plurality of machines each comprise at least one machine being executed by a physical machine.

4. The computer-implemented method of claim 1, wherein the network hopping adaptor is being executed by a designated machine.

5. The computer-implemented method of claim 1, wherein the network hopping adaptor is established as a physical machine.

6. The computer-implemented method of claim 1, wherein the change to at least one network characteristic of the received network traffic is based on time.

7. The computer-implemented method of claim 1, wherein the at least one network characteristic comprises an Internet Protocol ("IP") address, a media access control ("MAC") address, a port number, an encryption algorithm or a compression algorithm.

8. A system comprising:
    a plurality of machines, each machine having at least one network interface configured to send and receive network traffic to and from a network hopping adaptor; and
    a network hopping adaptor in communication with the plurality of machines via a local area network, wherein the network hopping adaptor is configured to:

when network traffic is received from at least one machine of the plurality of machines:
  manipulate the received network traffic so as to change at least one network characteristic of the network traffic; and
  send the manipulated network traffic as hopped network traffic based on the change to the at least one network characteristic; and
when network traffic is received that is intended for the at least one machine:
  manipulate the network traffic intended for the at least one machine so as to undo the change to the at least one network characteristic of the network traffic; and
  send the manipulated network traffic as unhopped network traffic to the at least one machine.

9. The system of claim 8, wherein each machine of the plurality of machines comprises a virtual machine being executed by a physical machine.

10. The system of claim 8, wherein:
the network hopping adaptor is being executed by a designated machine; and
the designated machine and the plurality of machines each comprise at least one machine being executed by a physical machine.

11. The system of claim 8, wherein the network hopping adaptor is being executed by a designated machine.

12. The system of claim 8, wherein the network hopping adaptor is established as a physical machine.

13. The system of claim 8, wherein the change to at least one network characteristic of the received network traffic is based on time.

14. The system of claim 8, wherein the at least one network characteristic comprises an IP address, a MAC address, a port number, an encryption algorithm or a compression algorithm.

15. A non-transitory, computer-readable medium having computer-executable instructions stored thereon that, when executed by one or more processors, the one or more processors are configured to perform a method, the method comprising:
configuring at least one network interface of a machine selected from a plurality of machines to send and receive network traffic to and from a network hopping adaptor in communication with the selected machine via a local area network;
when the network hopping adaptor receives network traffic from the selected machine:
  manipulating the received network traffic so as to change at least one network characteristic of the network traffic; and
  sending the manipulated network traffic as hopped network traffic based on the change to the at least one network characteristic; and
when the network hopping adaptor receives network traffic intended for the selected machine:
  manipulating the received network traffic so as to undo a change to the at least one network characteristic of the network traffic; and
  sending the manipulated network traffic as unhopped network traffic to the selected machine.

16. The non-transitory, computer-readable medium of claim 15, wherein each machine of the plurality of machines comprises a virtual machine being executed by a physical machine.

17. The non-transitory, computer-readable medium of claim 15, wherein:
the network hopping adaptor is being executed by a designated machine; and
the designated machine and the plurality of machines each comprise at least one machine being executed by a physical machine.

18. The non-transitory, computer-readable medium of claim 15, wherein the network hopping adaptor is established as a physical machine.

19. The non-transitory, computer-readable medium of claim 15, wherein the change to at least one network characteristic of the received network traffic is based on time.

20. The non-transitory, computer-readable medium of claim 15, wherein the at least one network characteristic comprises an IP address, a MAC address, a port number, an encryption algorithm or a compression algorithm.

\* \* \* \* \*